(12) United States Patent
Sloane et al.

(10) Patent No.: US 11,122,059 B2
(45) Date of Patent: Sep. 14, 2021

(54) INTEGRATED RESOURCE LANDSCAPE SYSTEM

(71) Applicant: BANK OF AMERICA CORPORATION, Charlotte, NC (US)

(72) Inventors: Brandon Sloane, Santa Barbara, CA (US); Rachel Yun Kim Bierner, Los Angeles, CA (US); Mark Earl Brubaker, Simi Valley, CA (US); Regina Yee Cadavid, San Gabriel, CA (US); John Brian Costello, Long Beach, CA (US); Cora Yan Quon, Los Angeles, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 181 days.

(21) Appl. No.: 16/105,832

(22) Filed: Aug. 20, 2018

(65) Prior Publication Data
US 2020/0059479 A1 Feb. 20, 2020

(51) Int. Cl.
| H04L 29/06 | (2006.01) |
| G06F 9/451 | (2018.01) |
| G06F 16/28 | (2019.01) |
| G06Q 50/26 | (2012.01) |

(52) U.S. Cl.
CPC .......... *H04L 63/1416* (2013.01); *G06F 9/451* (2018.02); *G06F 16/288* (2019.01); *G06Q 50/265* (2013.01); *H04L 63/20* (2013.01)

(58) Field of Classification Search
CPC ..... H04L 63/1416; H04L 63/20; G06F 9/451; G06F 16/288; G06Q 50/265
See application file for complete search history.

(56) References Cited

U.S. PATENT DOCUMENTS

| 7,020,617 | B2 | 3/2006 | Ouimet |
| 7,096,502 | B1 * | 8/2006 | Fox ......................... H04L 41/28 |
| | | | 707/999.008 |
| 7,346,529 | B2 | 3/2008 | Flores |
| 7,467,095 | B2 | 12/2008 | Ouimet |
| 7,752,562 | B2 | 7/2010 | Mohanty et al. |
| 7,870,004 | B2 | 1/2011 | Kananghinis et al. |
| 8,548,840 | B2 | 10/2013 | Anthony et al. |

(Continued)

*Primary Examiner* — Jason Chiang
(74) *Attorney, Agent, or Firm* — Michael A. Springs; Moore & Van Allen PLLC; Jeffrey R. Gray

(57) ABSTRACT

The invention relates to a resource landscape system that allows users to identify issues with elements within the organization and implement changes to the elements utilizing a relational database that utilizes nodes for defining the elements and relationships between the elements. The resource landscape system and applications therein provide a holistic inventory of resources, threat vectors, controls, metrics, policies, rules, and/or the like. The resource landscape system may be implemented through one or more interfaces that allows users to view cross-references of the elements, identify the priority of the elements using the crossed-references, and/or identify element issues in the elements of the organization that could results in threats to the organization. Moreover, the invention allows for receiving changes to one or more of the elements and automatically updating the cross-references of the elements, the priority of the elements, and/or the element issues.

14 Claims, 2 Drawing Sheets

(56) References Cited

U.S. PATENT DOCUMENTS

| | | | |
|---|---|---|---|
| 8,712,812 B2 | 4/2014 | Snow et al. | |
| 9,202,182 B2 | 12/2015 | Joodi | |
| 9,529,989 B2 | 12/2016 | Kling et al. | |
| 9,536,070 B2 | 1/2017 | Kling et al. | |
| 9,537,884 B1* | 1/2017 | Raugas | H04L 63/1433 |
| 9,558,334 B2 | 1/2017 | Kling et al. | |
| 9,792,322 B2 | 10/2017 | Merriman et al. | |
| 10,567,402 B1* | 2/2020 | Comeaux | H04L 63/1433 |
| 2007/0180490 A1* | 8/2007 | Renzi | H04L 63/145 |
| | | | 726/1 |
| 2007/0265899 A1 | 11/2007 | Angier et al. | |
| 2008/0262895 A1* | 10/2008 | Hofmeister | G06Q 10/0631 |
| | | | 705/7.17 |
| 2011/0231221 A1* | 9/2011 | Worwetz | G06Q 10/06 |
| | | | 705/7.28 |
| 2011/0252479 A1* | 10/2011 | Beresnevichiene | G06F 21/577 |
| | | | 726/25 |
| 2012/0143650 A1* | 6/2012 | Crowley | H04L 41/28 |
| | | | 705/7.28 |
| 2012/0233698 A1* | 9/2012 | Watters | G06F 21/577 |
| | | | 726/25 |
| 2015/0088614 A1 | 3/2015 | King | |
| 2017/0346839 A1* | 11/2017 | Peppe | H04L 63/1433 |
| 2017/0346846 A1* | 11/2017 | Findlay | H04L 63/1433 |
| 2018/0020018 A1* | 1/2018 | Walheim | G06F 21/57 |
| 2018/0137288 A1* | 5/2018 | Polyakov | G06F 21/577 |
| 2018/0189697 A1* | 7/2018 | Thomson | G06Q 10/0635 |
| 2018/0316711 A1* | 11/2018 | Iyer | H04W 12/128 |
| 2018/0375892 A1* | 12/2018 | Ganor | G06F 3/04847 |

* cited by examiner

INTEGRATED RESOURCE LANDSCAPE SYSTEM

FIELD

The present invention relates to managing resources with respect to potential threats, and more particularly to an integrated resource landscape and implementation system for monitoring resources and implementing changes to the resource to reduce resource threats.

BACKGROUND

Organizations institute systems and procedures for identifying threats and implementing resource changes. It is difficult for organizations to identify threats, implement resource changes, and identify how the changes affect other resources.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer implemented methods, and computer products are described herein for a resource landscape system that allows users to identify issues with elements within the organization (e.g., resources—systems, applications, or the like, threat vectors, controls, metrics, policies, rules, or the like), and implement changes to the elements utilizing a relational database that utilizes nodes for defining the elements and relationships between the elements. The resource landscape system and applications therein provide a holistic inventory of resources, threat vectors, controls, metrics, policies, rules, and/or the like. The resource landscape system may be implemented through one or more interfaces that allows users to view cross-references of the elements, identify the priority of the elements using the crossed-references, and/or identify element issues (e.g., gaps, redundancies, deficiencies, or the like) in the elements of the organization that could results in threats to the organization). Moreover, the invention allows for receiving changes to one or more of the elements and automatically updating the cross-references of the elements, the priority of the elements, and/or the element issues.

It should be understood that the generation of the inventories of the elements of the organization, and/or the cross-references between the elements, provides a holistic view of the elements, identifies threats, and allows for the implementation of changes to the elements. For example, cross-referencing resources with threat vectors provides threat points that may be prioritized, which illustrates the combinations of resources and threat vectors that provide the greatest threats to the organization. Additionally, the threat points may be cross-referenced with the controls, which provides potential control issues (e.g., missing controls, redundancies, and/or discrepancies) that can be used to remediate (e.g., automatically based on recommended changes, or the like). Moreover, the threat points may be cross-referenced with the metrics, which indicates the threat points that are and are not being measured appropriately and make recommendations for providing, removing, and/or amending the metrics. Furthermore, cross-referencing the threat points with policies indicates what should be done based on internal organizational mandates, and/or with rules that indicate what should be done based on external laws, both of which may be used to identify and remediate issues in threat coverage.

Embodiments of the invention relate to an integrated resource landscape system for remediating threats. The invention comprises accessing a resource inventory of resources within an organization, accessing a threat vector inventory of threat vectors within the organization, and cross referencing the resources with the threat vectors to define threats points within a threat point matrix. The invention further comprises determining priorities for the threat points, and displaying to a user the threat points within one or more graphical interfaces illustrating the priorities with respect to the threat points.

In other embodiments, the invention further comprises accessing a control inventory for controls within the organization that mitigate the threat points, and cross referencing the controls with the threat points to define an element matrix. The invention further comprises determining priorities for the threat points based on the controls, and displaying to the user the element matrix within the one or more graphical interfaces illustrating the priorities with respect to the threat points and the controls.

In yet other embodiments, the invention further comprises accessing a metrics inventory for metrics within the organization that indicate how the threat points are measured, and cross referencing the metrics with the threat points to define an element matrix. The invention further comprises determining priorities for the threat points based on the metrics, and displaying to the user the element matrix within the one or more graphical interfaces illustrating the priorities with respect to the threat points and the metrics.

In still other embodiments, the invention further comprises accessing a policies inventory for policies within the organization that indicate operation of the threat points, and cross referencing the policies with the threat points to define an element matrix. The invention further comprises determining priorities for the threat points based on the policies, and displaying to the user the element matrix within the one or more graphical interfaces illustrating the priorities with respect to the threat points and the policies.

In other embodiments, the invention further comprises accessing a rules inventory for rules outside the organization that indicate operation of the threat points, and cross referencing the rules with the threat points to define an element matrix. The invention further comprises determining priorities for the threat points based on the rules, and displaying to the user the element matrix within the one or more graphical interfaces illustrating the priorities with respect to the threat points and the rules.

In further accord with some embodiments, the invention further comprises accessing one or more element inventories for elements comprising at least controls, metrics, policies, and rules for operation of the threat points, and cross referencing the threat points with the elements to define one or more element matrices. The invention further comprises determining priorities for the threat points based on the elements, and displaying to the user the one or more element matrices within the one or more graphical interfaces illustrating the priorities with respect to the threat points and the elements.

In other embodiments of the invention, the one or more element matrices provide a representation of a threat level for threat points and the elements, and the threat level of the threat points diminishes within the one or more element matrices farther from an origin.

In still other embodiments, the invention further comprises receiving a change to at least one element of the elements, accessing a relational database that stores nodes for relationships between the elements, and determining the nodes affected by the change to the at least one element. The invention further comprises identifying other elements associated with the nodes within the relational databases, and displaying the elements associated with the nodes to the user through a user computer system.

In yet other embodiments, the invention comprises determining updated priorities for the threat points based on the nodes affected by the change to the at least one of the elements, and displaying to the user the one or more element matrices within the one or more graphical interfaces illustrating the updated priorities with respect to the threat points and the elements.

In further accord with embodiments of the invention, the relational database comprises a graphical relational database illustrating the relationships between the resources, the threat vectors, the controls, the metrics, the policies, and the rules.

In other embodiments of the invention, the resource inventory is structured based on individual resources and resource classes to which each individual resource belongs.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
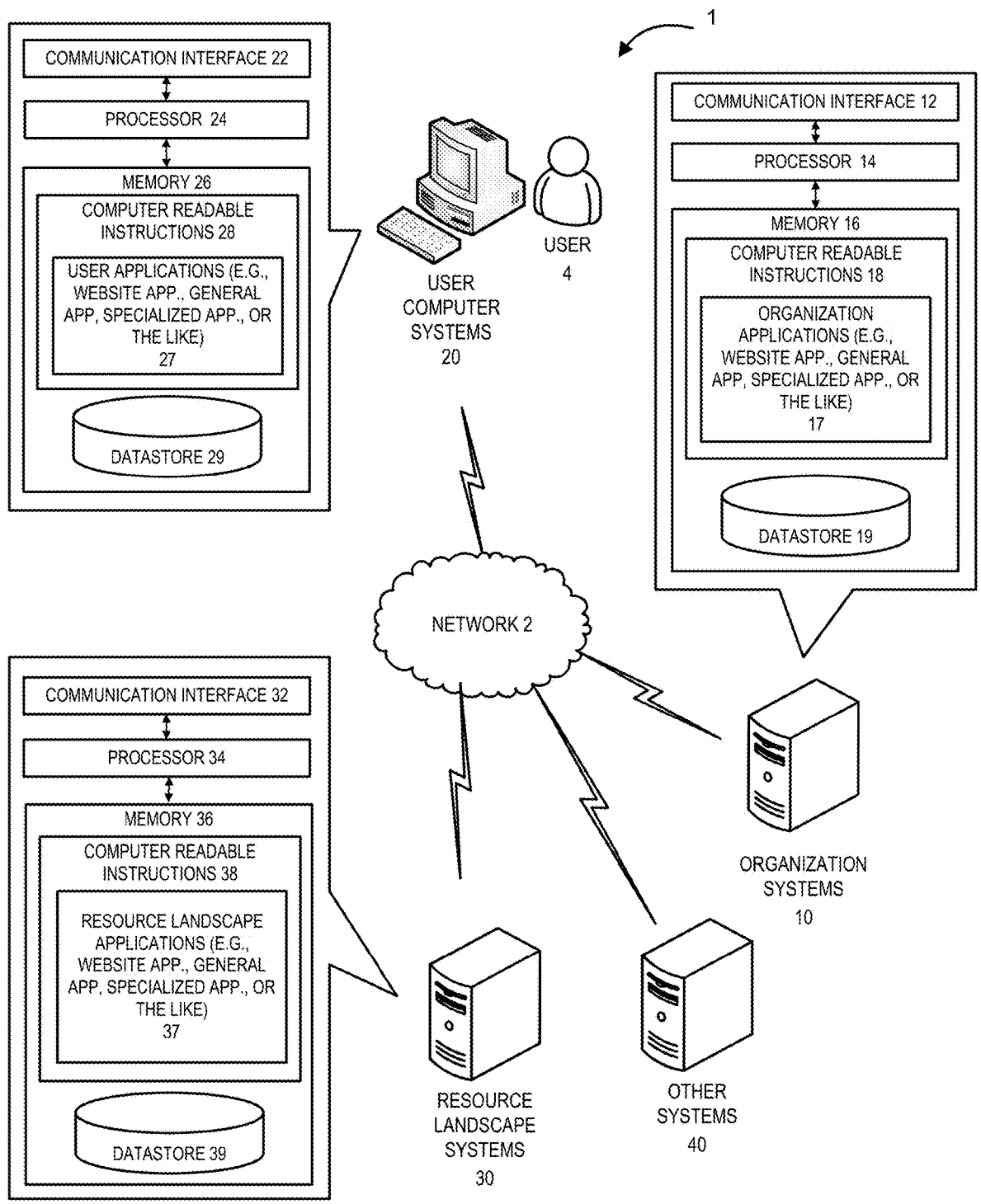

Having thus described embodiments of the invention in general terms, reference will now be made to the accompanying drawings, and wherein:

FIG. 1 illustrates a block diagram of an integrated resource landscape system environment, in accordance with one or more embodiments of the invention.

Figure 2:
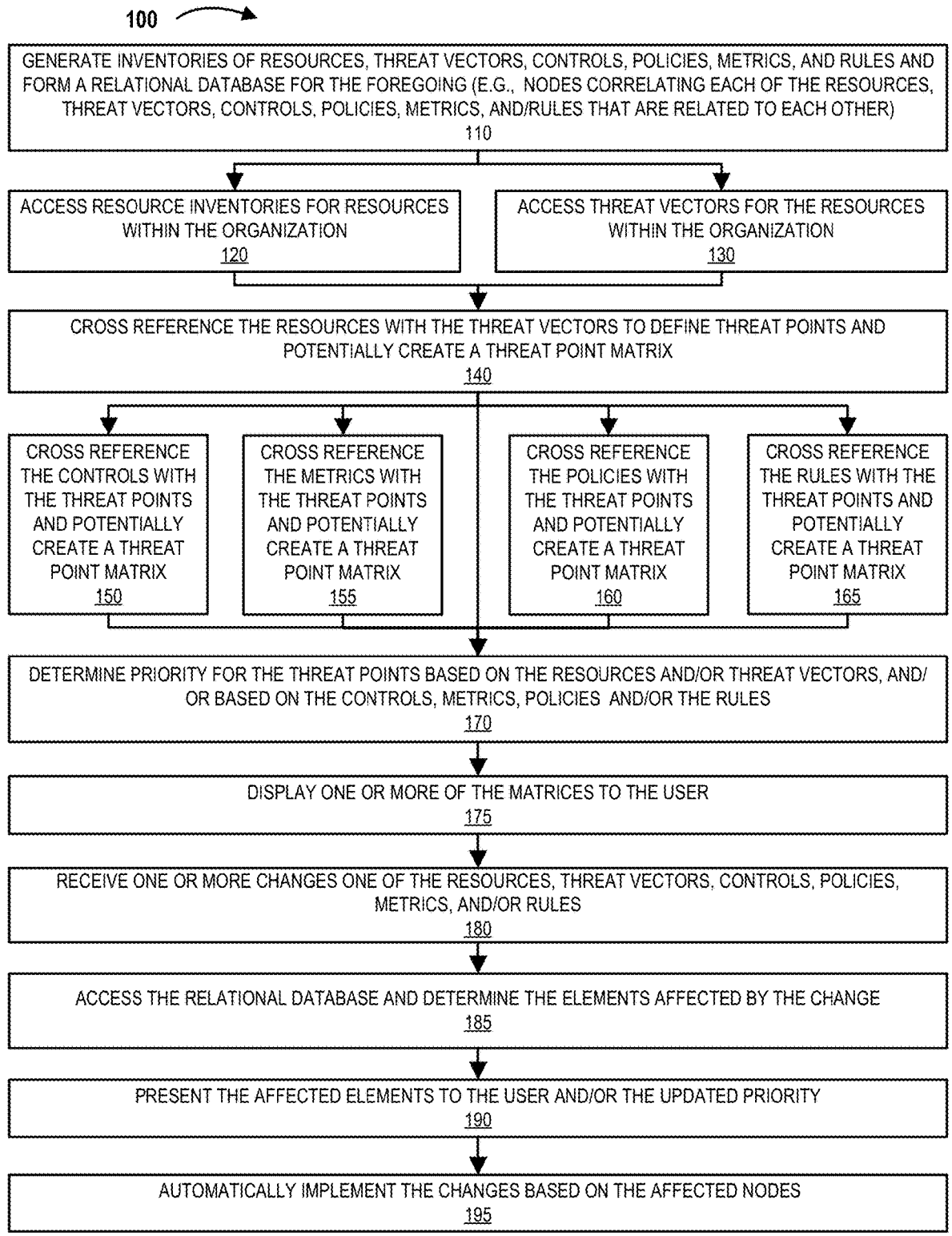

FIG. 2 illustrates an integrated resource landscape process, in accordance with one or more embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed for a resource landscape system that allows users to identify issues with elements (e.g., resources—systems, applications, or the like, threat vectors, controls, metrics, policies, rules, or the like) within the organization, and implement changes to the elements utilizing a relational database that utilizes nodes for defining the elements and relationships between the elements. The resource landscape system and applications therein provide a holistic inventory of resources, threat vectors, controls, metrics, policies, rules, and/or the like. The resource landscape system may be implemented through one or more interfaces that allows users to view cross-references of the elements, identify the priority of the elements using the crossed-references, and/or identify elements issues (e.g., gaps, redundancies, and/or deficiencies in the elements of the organization that could results in threats to the organization). The priority of the elements may be sorted and displayed in one or more matrices, and the distance from the origin of the one or more matrices may indicate the priority of the elements with respect to each other. Moreover, the invention allows for receiving changes to one or more of the elements and automatically updating the cross-references of the elements, the priority of the elements, and/or the element issues.

It should be understood that the generation of the inventories of the elements of the organization, and/or the cross-references between the elements, provides a holistic view of the elements, identifies threats, and allows for the implementation of changes to the elements. For example, cross-referencing resources with threat vectors provides threat points that may be prioritized, which illustrates the combinations of resources and threat vectors that provide the greatest threats to the organization. Additionally, the threat points may be cross-referenced with the controls, which provides potential control issues (e.g., missing controls, redundancies, and/or discrepancies) that can be used to remediate (e.g., automatically based on recommended changes, or the like). Moreover, the threat points may be cross-referenced with the metrics, which indicates the threat points that are and are not being measured appropriately and make recommendations for providing, removing, and/or amending the metrics. Furthermore, cross-referencing the threat points with policies indicates what should be done based on internal organizational mandates, and/or with rules that indicate what should be done based on external laws, both of which may be used to identify and remediate issues in threat coverage.

FIG. 1 illustrates an integrated resource landscape system environment 1, in accordance with embodiments of the invention. As illustrated in FIG. 1, one or more organization systems 10 are operatively coupled, via a network 2, to one or more user computer systems 20, one or more resource landscape configuration systems 30, and/or one or more other systems 40. In this way, the one or more organization systems 10 may be the systems that run the applications that the organization uses within the organization's operations. The users 4 (e.g., one or more associates, employees, agents, contractors, sub-contractors, third-party representatives, customers, or the like), may include the users 4 that are responsible for and/or use the organization applications 17 and systems 10 that are utilized by the organization during the operation of the organization. As such, the one or more organization systems 10 may be utilized by the users 4 for the operation of the organization through communication between the one or more organization systems 10 and the one or more user computer systems 20, and moreover, the users 4 may use the one or more user computer systems 20 to communicate with the one or more resource landscape systems 20 to utilize the one or more resource landscape systems 20. For example, users 4 can create and utilize the resource landscape in order to identify threats, controls, metrics, polices, and/or rules associated with resources, prioritize the resources based on the threats, identify issues in the controls, metrics, policies, and/or rules, identify how organizational changes to the elements affect other related elements, implement changes to the organizational elements, and identify how the change impacts the prioritization of the elements through the one or more resource landscape systems 20. As such, the one or more resource landscape systems 20 may communicate with the one or more organization systems 10 directly and/or through the use of the one or more user computer systems 20 and/or the other systems 40 such that users 4 can utilize the resource landscape applications 37, as will be described herein.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more configuration systems 30, and/or one or more other systems 40. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with) the one or more user computer systems 20 and user applications 27, the one or more resource landscape systems 30 and resource landscape applications 37 thereof, and/or other systems 40 or applications thereof As further illustrated in FIG. 1, the one or more user computer systems are operatively coupled, via a network 2, to the one or more organization systems 10, one or more resource landscape configuration systems 30, and/or one or more other systems 40. As illustrated in FIG. 1, users 4 may try to access the one or more organization systems 10 in order to operate the organization and/or access the one or more resource landscape systems 30 in order to identify threats, controls, metrics, polices, and/or rules associated with resources, prioritize the resources based on the threats, identify issues in the controls, identify how organizational changes to the elements affect other related elements, implement changes to the organizational elements, and identify how the change impacts the prioritization of the elements through the one or more resource landscape systems 20. The users 4 may utilize the one or more user computer systems 20 to communicate with and/or access information from the one or more organization systems 10 and/or from other user computer systems 20, and moreover, communicate with and/or access the one or more resource landscape systems 30 to perform the tasks described herein. As such, it should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, and one or more memory components 26, and/or the user applications 27 used by any of the foregoing, such as web browsers applications, dedicated applications, specialized applications, or portions thereof.

The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more resource landscape systems 30, and/or the one or more other systems 40. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to operate the organization and/or use the one or more resource landscape systems 30 in order to identify threats, controls, metrics, polices, and/or rules associated with resources, prioritize the resources based on the threats, identify issues in the controls, identify how organizational changes to the elements affect other related elements, implement changes to the organizational elements, and identify how the change impacts the prioritization of the elements through the one or more resource landscape systems 20.

As illustrated in FIG. 1, the one or more resource landscape systems 30 may communicate with the one or more organization systems 10 and/or the one or more user computer systems 20, directly or indirectly. The one or more resource landscape systems 30, as will be described in further detail herein, may be utilized to identify threats, controls, metrics, polices, and/or rules associated with resources, prioritize the resources based on the threats, identify issues in the controls, identify how organizational changes to the elements affect other related elements, implement changes to the organizational elements, and identify how the change impacts the prioritization of the elements. As such, the one or more resource landscape systems 30 are operatively coupled, via a network 2, to the one or more organization systems 10, the one or more user computer systems 20, and/or the one or more other systems 40. It should be understood that the one or more resource landscape systems 30 may be a part of the one or more other systems 40 (e.g., one or more third party systems, or the like) or may be a part of the one or more organization systems 10. As such, the one or more resource landscape systems 30 may be supported by a third-party and/or by the organization.

The one or more resource landscape systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, and/or the one or more other systems 40. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more configuration systems 30 may have computer-readable instructions 38 stored in the one or more memory components 36, which in some embodiments includes the computer-readable instructions 38 of one or more resource landscape applications 37 that allow the users 4 to identify threats, controls, metrics, polices, and/or rules associated with resources, prioritize the resources based on the threats, identify issues in the controls, identify how organizational changes to the elements affect other related elements, implement changes to the organizational elements, and identify how the change impacts the prioritization of the elements, as will be described herein.

Moreover, the one or more other systems 40 may be operatively coupled to the one or more organization systems 10, the one or more user computer systems 20, and/or the one or more resource landscape systems 30, through the network 2. The one or more other systems 40 may be one or more intermediate systems and/or third party systems that communicate with and/or allow communication between the one or more organization systems 10, the one or more user computer systems 20, and/or the one or more resource landscape systems 30 (e.g., one or more communication components, one or more processor components, and one or more memory components with computer-readable instructions of one or more applications, one or more datastores, or the like). Thus, the one or more other systems 40 communicate with the one or more organization systems 10, the one or more user computer systems 20, the one or more resource landscape systems 30, and/or each other in same or similar way as previously described with respect to the one or more organization systems 10, the one or more user computer systems 20, and/or the one or more resource landscape systems 30.

FIG. 2 illustrates a process flow for developing and utilizing an integrated resource landscape system, in accordance with one or more embodiments of the invention. Block 110 of FIG. 2 illustrates that inventories of the elements, such as the resources, threat vectors, controls, polices, metrics, and rules are created and a relational database is formed for the forgoing. For example, lists are created for each of the resources, threat vectors, controls, policies, metrics, and/or rules and a relational database may be formed between each of the elements. Moreover, the relational database may be, or may be used to form, a graphical relational database with nodes that represent one or more of the elements, and the nodes are coupled together to illustrate the relationships between the elements, as will be described in further detail herein.

It should be understood that the resources may include all of the systems and/or applications therefor used by the organization, such as but not limited to workstations, mobile devices, application servers, or any other like systems, and applications therefor. The resources may also include information about the resources, such as the resource type, resource location, resource users, resource line of business, or the like. Moreover, the resources may be grouped based on the foregoing factors, or the like.

The threat vectors are the threats to the organization and/or the resources thereof. The threats may include any type of threat to the organization, such as but not limited to data exfiltration (e.g., extraction, loss, or the like of intellectual property data, customer data, financial data, organizational data, or any other type of data), resource damage (e.g., viruses, physical damage, or the like), operational threats (e.g., resource downtime, process downtime, manufacturing downtime, or the like), or any other like threat to which an organization could be exposed. The threats may include vectors that illustrate the components of the threat and/or the extent thereof with respect to the threats. For example, the threat vectors may represent the relative skill of the threat actor, force of intent of the threat, or strength of the threat, or the like with respect to each resource and/or other elements. As such, the threat vector may illustrate the individual components of the threats.

The controls are the way the organization monitors and constrains the resources in order to mitigate the threat vectors. The controls may relate to users, processes, and/or technologies that are utilized in order to mitigate the threat vectors. For example, the controls may include users that are responsible for monitoring the resources, the processes in place for allowing use of the resources (e.g., resource usage is checked by two independent sources), and/or the technology used associated with the resources (e.g., systems that automatically scan resources for potential threats, or the like).

The metrics are the features used by the organization to measure and track the resources and threat vectors for the organization. For example, the metrics may be the data accessed by the resources, the interactions used with the resources (e.g., the number of data transfers made, the transaction types associated with the resources, the amount of data shared using the resource, or the like), the use of the resources (e.g., amount of time a user uses the resources, the time the user is logged into the resources, or the like).

The policies are the internal policies of the organization for the resources of the organization. For example, the organization may have policies regarding what users 4 can use and/or access what resources, what actions the users 4 can take on the resources, the actions that are allowed using the types of resources, changes that can be made on various resources, or the like.

The rules are the laws and regulations that the organization has to follow for the operation of the business. For example, the rules may include the laws associated with handling different types of data, the location from which the data is received or to which the data is sent, the users accessing the data, the channels through which the data must be sent, the reporting associated with the data, or the like.

The inventories of the resources, threat vectors, controls, polices, metrics, and rules may be stored alone and/or with other information regarding each of the elements in order to classify, quantify, and/or provide other information along with the resources, threat vectors, controls, polices, metrics, and/or rules.

The relational database may graphically illustrate the relationships between of all of the elements and provide a holistic view of the resources, the associated threats, controls, metrics, policies, and/or rules. Moreover, the matrices may prioritize the crossed-referenced elements based on the distance from the origin of each of the matrices in order to represent the relative skill of the threat actor, force of intent of the threat, or strength of the threat, or the like. Moreover, the matrices provide an indication of a visual representation of the general scale of the inherent threat associated with the resources and the other elements that could be used to mitigate the threat.

Block 120 in FIG. 2 illustrates that the system (e.g., organization system, resource landscape system, or the like) accesses resource inventories for resource within the organization. For example, the system accesses the inventories of the resources that the organization uses. Moreover, as illustrated in block 130 of FIG. 2, the system accesses the threat vectors for the resources within the organization. It should be understood that the threat vectors may include general universal threats for all of the resources, general threats for a subset of resources (e.g., groups of similar resources, groups of resources within a particular line of business, groups of resources based on location, resources used by an individual or group of individuals, or the like), specific threats for specific resources (e.g., specific threat vectors based on specific user and/or specific resources, or the like).

As illustrated in block 140 of FIG. 2, the system then cross-references the resources of the organization with the threat vectors for the resources in order to determine the threat points between resources and threat vectors. It should be understood that the resources and threat vectors may be cross-referenced in a number of ways, such as, but not limited to creating a matrix. As such, a threat point matrix may be formed that provides the intersection of all the resources and all of the threat vectors. The threat matrix may provide an indication of whether or not a particular resource and an associated threat vector are related. That is, a particular output in the threat matrix may indicate whether or not the threat vector applies to the resource (e.g., the threat of e-mailing sensitive data from a laptop or workstation is an actual threat, while the threat of sending an e-mail from a resource that is not Internet connected is non-existent). Moreover, the threat matrix may be filtered in ways which allow for the sorting of the threat points in a way that lists the threat points in accordance with the importance. As such, the threat point for a resource that has both internal organization access and/or external organization access may be more important than a resource that only can access the Internal network of the organization (e.g., not allowed to send communication outside of the organization). Alternatively, a resource that is controlled by a user 4 that has access to sensitive business data may be more important than a resource for which a user only has limited access to organization information. As such, the threat point matrix can provide an indication of what threat vectors apply to what resources, and moreover a determination of how real are the threat vectors for the resources. The threat point matrix illustrates potential issues (e.g., gaps, redundancies, deficiencies, and/or the like) related to combinations of resources and threat vectors.

Block 150 of FIG. 2, illustrates that the system may further cross reference the threat points (e.g., cross reference of the resources and threat vectors) with the controls that the organization utilizes to mitigate the threat points. In some embodiments the controls may be cross referenced directly with the resources and/or the threat vectors in order to provide other information regarding the controls. However, cross-referencing the controls with the threat points provides insight into how each of the controls affects the specific resources and the threat vectors for the specific resources. With respect to the example related to the threat of data exfiltration, the controls may include scanning communication for information before the communication is sent, preventing the use of external drives on the resources, or the like. It should be understood that by cross-referencing the controls with the threat points, the system may be able to identify where there are element issues (e.g., gaps, redundancies, deficiencies, and/or the like) in the landscape related to the controls (e.g., illustrating where the proper controls are missing). Alternatively, the matrix of threat points and controls may also indicate where redundant controls are implemented for resources that could be eliminated in order to reduce processing capacity, costs, or the like. Furthermore, the matrix of threat points and controls may also indicate where controls for particular threat points are deficient, and thus, require additional or altered controls. The matrix of threat points and controls illustrating the types of controls for the resources and/or threat vectors may be leveraged in order to change the controls for other similar resources and/or threat points.

Block 155 of FIG. 2, illustrates that the system may further cross reference the threat points (e.g., cross reference of the resources and threat vectors) with the metrics that the organization utilizes to monitor the threat points. In some embodiments the metrics may be cross-referenced directly with the resources and/or the threat vectors in order to provide other information regarding the metrics. However, cross-referencing the metrics with the threat points provides insight into how each of the metrics affect the specific resources and the threat vectors for each of the resources. With respect to the example related to the exfiltration of data, the metrics may include metrics that measure and track the increases in the number of communications from particular resources that have been identified as sending communications that include sensitive data. It should be understood that by cross-referencing the metrics with the threat points, the system may be able to identify were there are issues (e.g., gaps, redundancies, deficiencies, or the like) in the landscape, such for example types of metrics that are missing for particular resources and/or threat vectors. Alternatively, the matrix of threat points and metrics may also indicate where redundant metrics are implemented or the metrics are not properly capturing the threat for the particular resource, and as such could be eliminated and/or changed in order to reduce false negatives and/or increase the accuracy of measuring the threat point. Furthermore, the matrix of threat points and metrics may also indicate where metrics for particular threat points may be leveraged to use for other threat points that do not have metrics or do not have the proper metrics.

FIG. 2 further illustrates in block 160 that the system may further cross reference the threat points (e.g., cross reference of the resources and threat vectors) with the policies that the organization has implemented for the operation of the organization. In some embodiments the policies may be cross referenced directly with the resources and/or the threat vectors in order to provide other information regarding the policies. However, cross-referencing the policies with the threat points provides insight into how each of the policies affects the specific resources and the associated threat vectors for each of the resources. With respect to the example related to the exfiltration of data, the policies may include a policy that all external e-mails outside of the organization may be blocked when the e-mail includes various types of information or combinations thereof (e.g., account information, customer identification numbers, or the like). As such, the polices may make sense for particular resources and for particular threats, but not for other resources and/or threats, and as such, the system identifies resources and/or threat vectors where there might be policy issues (e.g., gaps, redundancies, discrepancies, unnecessary policies, and/or the like).

FIG. 2 further illustrates in block 165 that the system may further cross reference the threat points (e.g., cross reference of the resources and threat vectors) with the rules that the organization is required to follow for the operation of the organization. In some embodiments the rules may be cross referenced directly with the resources and/or the threat vectors in order to provide other information regarding the policies. However, cross-referencing the rules with the threat points provides insight into how each of the rules affects the specific resources and the associated threat vectors for each of the resources. With respect to the example related to the exfiltration of data, the rules may include regulations related to security, storage, and reporting requirements for misappropriation of information (e.g., account information, customer identification numbers, or the like), privacy requirements in various countries, and/or the like. As such, the rules may make sense for particular resources and for particular threats, but not for others, and as such, the system identifies resources and/or threat vectors where there might be issues (e.g., gaps, redundancies, discrepancies, unnecessary rules, and/or the like).

Block 170 of FIG. 2 illustrates that the priority of the threat points are determined based on the resources and/or threat vectors, and/or based on the controls, metrics, policies and/or the rules associated therewith. For example, the priority of the threat points may be determined based on the importance of the resource and/or the threat vector of the threat point. Moreover, the priority may be set for the resources and/or the threat vector based on the number and severity of the threats associated with each resource, such as the aggregate of the number of threat vectors scaled based on the severity of the each of the threat vectors for a particular resource. Alternatively, the priority may be set for the threat vectors based on the severity of the threat vector and the number of resources with which the threat vector is associated. In still other embodiments the threat points (e.g., or the individual resources and/or threat vectors associated therewith) may be prioritized based on the strength (or lack thereof) of the controls, the metrics that are used to monitor the resources and/or threat vectors of the threat points, the compliance and/or importance of the policies (or lack thereof) in relation to the resources and/or threat vectors, and/or the compliance with the rules (or lack thereof) in relation to the resources and/or the threat vectors. In this way priorities of each of the resources, threat vectors, controls, matrices, policies, and/or the rules may be scored, ranked, or the like; however, the organization typically prioritizes each of these individually, and thereafter the priority may be scaled for the each of the threat points, and potentially, the controls, metrics, policies, and/or rules in order to determine priorities based on each of the foregoing or combinations thereof. In some embodiments of the invention, the priorities may be sorted within the individual matrices based on the priorities.

As illustrated by block 175 of FIG. 2, the results of the cross-referencing and/or the priorities of the threat points (or the resources and/or threat vectors individually) alone or based on the controls, metrics, policies, and/or rules may be displayed to the user 4 on the user computer systems 20. It should be understood that a user 4 is able to use one or more integrated interfaces (e.g., integrated with the combinations of the elements) to view cross-referenced information and the priority of the various components thereof. As such, the user may pick and choose what matrices to view in the interfaces and the associated priorities for each. For example, the matrices and/or priories may be displayed in a graphical user interface that allows a user to navigate the various elements and determine the connections between the various elements to better understand the threats for the resources and the elements associated therewith. Moreover, in some embodiments of the invention the system will automatically present to the user 4 in the one or more interfaces the element issues that are found in the threat points or threat points that are being monitored. Alternatively, the user may review the cross-referenced elements and the priorities of the individual elements based on the cross-referenced information the system (or user 4 thereof) may determine issues in the threat points that require changes (e.g., filling in gaps, reductions in certain elements because of the low priority, and/or the like).

Block 180 of FIG. 2 illustrates that changes to at least one of the resources, threat vectors, controls, policies, metrics, and/or rules may be received by the organization (or third-party controlling the support of the resource landscape systems 30). It should be understood that the one or more changes may be changes that are automatically implemented based solely on the implementation changes, routine resource maintenance, scheduled configuration changes which will change the threat points automatically as the changes are implanted during the day-to-day operations of the organization. Alternatively, the one or more changes may be specific based on the use of the resource landscape systems described herein.

With respect to the resources, the requested change may include a change to a configuration of one of the resources (e.g., users that can access the resources, the ability of the resource to perform a task, the other resources to which the resource is connected, or the like). As such, the system may change the configuration of the resource to temporality or permanently change the operation of the resource. The user may be able to examine how the proposed resource change affects the threat points and/or priorities of the individual elements associated therewith before change to the resource is implemented. If the change is acceptable the system (or users 4 thereof) may allow the change to be implemented.

With respect to the threat vectors, the requested change may be to identify other resources that may relate to a threat vector to which the threat vector was previously associated. That is, upon review the threat points, the user 4 may identify other resources to which the threat vector may be applied, but which were not previously associated with the threat vector. Alternatively, the requested change may be to remove an association between a threat vector and a resource to which the threat vector was previously applied. Moreover, before any change to a threat vector is implemented the system (or user thereof) may review the change to the threat vector before it is implemented within the resource landscape system 30.

With respect to changes to the controls, any control changes may be reviewed before being implemented in order to determine the effect on the other elements. For example, the matrices of the threat points cross-referenced with the controls may illustrate the threat points that do not have controls (e.g., potentially high priority), the threat points that have too many controls (e.g., potentially low priority for potential issues, but high priority to reduce costs by removing controls), the threat points that have controls that may not be effective. As such, the change may relate to adding controls to threat points, removing controls from threat points, and/or changing controls from threat points. As with the other elements, the control changes may be represented graphically within the one or more interfaces before such control changes are implemented in order to determine the effect of the control changes on other elements.

The change may also relate to change in metrics that are used to measure the threat point (e.g., operation of the resource, and/or occurrence of the threat point), the control, policy, and/or rule for the threat point. Like the controls, the cross-reference and priority information may indicate that the threat points do not have metrics (e.g., high priority because the threat points may not have any metrics in place for monitoring), have too many metrics (e.g., low priority for potential issue, but high priority to reduce cost by removing metrics), and/or have the wrong metrics being use for the threat points (e.g., high priority because the organization is measuring the wrong thing). As such, the change may relate to adding, removing, or changing metrics for the threat points. Like the other elements, any changes to the metrics may be removed in the one or more interfaces in order to determine the other elements affected and/or how the change to the metrics affects the priorities.

In still other embodiments, the change may be related to the policies (e.g., internal organization policies) and/or the rules (e.g., outside rules that the organization is required to follow). As such, the cross-referencing and the priority of the threat points with respect to the policies and/or rules may indicate the threat points that do not have the proper policies or rules, have too many associated policies or rules, and/or have the incorrect policies and/or rules. Like the other elements any changes in the policies and/or rules may be made in order to add new policies or rules where there are gaps, remove policies or rules which are incorrectly applied to threat points, or adjust the policies or rules which are not being properly applied.

FIG. 2 illustrates in block 185 that when a change is made to one or more of the elements, the system may access the relational database and determine the elements that the changes may affect. Moreover, FIG. 2 illustrates in block 190 that the affected elements are presented to the user. For example, a change to one control may affect resources that the user did not mean to affect. Returning to the exfiltration of data example, the system (or user thereof) may prevent resources from e-mail customer information in order to protect sensitive customer information; however, this change may affect legitimate correspondence with customers. As such, the relational database allows the system and/or the users 4 thereof to determine the unintended consequences of making a change to one of the elements. Moreover, the relational database may also present the resources and/or threat points not affected by the change, which further allows the system and/or users 4 thereof to determine gaps in the elements. For example, returning to the exfiltration of data example, the user 4 may identify the resources that are not affected by the change to the control, and thus, may identify other resources that have the same potential threat that currently do not have any controls.

Block 195 of FIG. 2 illustrates that the system and/or user thereof may automatically implement changes to the elements when identified and/or approved by the user 4. For example, changes in controls may be pushed to resources that could be affected by the threat and which do not currently have any controls to mitigate the threat. Moreover, it should be understood that when one or more changes are received and implemented, the relational databases for the elements associated with the one or more changes are accessed and are automatically updated based on the one or more changes. As such, it should be understood that any changes to the resources, the threat vectors, controls, metrics, polices, rules, and/or the like may automatically change the threat points, the cross-references with the controls, metrics, policies, and/or rules, as well as the priority of the threat points based on each of the foregoing.

It should be understood, that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. An integrated resource landscape system for remediating threats, the system comprising:
   one or more memory components having computer readable code stored thereon; and
   one or more processing components operatively coupled to the one or more memory components, wherein the one or more processing components are configured to execute the computer readable code to:
   access a resource inventory of resources within an organization;
   access a threat vector inventory of threat vectors within the organization;
   cross reference the resources with the threat vectors to define threat points within a threat point matrix;
   access one or more element inventories for elements comprising at least controls, metrics, policies, and rules for operation of threat points, cross reference the threat points with the elements to define one or more element matrices;
determine priorities for the threat points based on the threat points and the one or more element matrices;
display to a user the one or more element matrices within one or more graphical interfaces illustrating the priorities with respect to the threat points and the elements, including displaying to the user the threat points within the one or more graphical interfaces illustrating the priorities with respect to the threat points alone and integrated with the controls, the metrics, the policies, and the rules, wherein the display allows navigation of various elements for connection identification of threats for the resources within an organization;
receive a change to at least one element of the elements, including receiving a change to a configuration of one of the resources, wherein the change comprises at least users that can access the resource, ability of the resource to perform a task, and other resources to which the resource is connected;
determine an effect of the change on the threat points within the threat point matrix;
receive an indication from the user that the effect of the change is acceptable; and
implement the change to a configuration of one of the resources;
access a graphical relational database that stores nodes for relationships between the elements, wherein the graphical relational database illustrates the relationships between the resources, the threat vectors, the controls, the metrics, the policies, and the rules;
determine the nodes affected by the change to the at least one element;
identify other elements associated with the nodes within the graphical relational database;
determine updated priorities for the threat points based on the nodes affected by the change to the at least one of the elements; and
display to the user the one or more element matrices within the one or more graphical interfaces illustrating the updated priorities with respect to the threat points and the elements.

2. The system of claim 1, wherein the one or more processing components are configured to execute the computer readable code to:
access a control inventory for the controls within the organization that mitigate the threat points;
define an element matrix based on the cross reference of the controls with the threat points;
determine the priorities for the threat points based on the controls; and
display to the user the element matrix within the one or more graphical interfaces illustrating the priorities with respect to the threat points and the controls.

3. The system of claim 1, wherein the one or more processing components are configured to execute the computer readable code to:
access a metrics inventory for the metrics within the organization that indicate how the threat points are measured;
cross reference the metrics with the threat points to define an element matrix;
determine the priorities for the threat points based on the metrics; and
display to the user the element matrix within the one or more graphical interfaces illustrating the priorities with respect to the threat points and the metrics.

4. The system of claim 1, wherein the one or more processing components are configured to execute the computer readable code to:
access a policies inventory for the policies within the organization that indicate operation of the threat points;
cross reference the policies with the threat points to define an element matrix;
determine the priorities for the threat points based on the policies; and
display to the user the element matrix within the one or more graphical interfaces illustrating the priorities with respect to the threat points and the policies.

5. The system of claim 1, wherein the one or more processing components are configured to execute the computer readable code to:
access a rules inventory for the rules outside the organization that indicate operation of the threat points;
cross reference the rules with the threat points to define an element matrix;
determine the priorities for the threat points based on the rules; and
display to the user the element matrix within the one or more graphical interfaces illustrating the priorities with respect to the threat points and the rules.

6. The system of claim 1, wherein the one or more element matrices provide a representation of a threat level for the threat points and the elements, and wherein the threat level of the threat points diminishes within the one or more element matrices farther from an origin.

7. The system of claim 1, wherein the resource inventory is structured based on individual resources and resource classes to which each individual resource belongs.

8. A computer implemented method for remediating threats using an integrated resource landscape system, the method comprising:
accessing, by one or more processor components, a resource inventory of resources within an organization;
accessing, by the one or more processor components, a threat vector inventory of threat vectors within the organization;
cross referencing, by the one or more processor components, the resources with the threat vectors to define threat points within a threat point matrix; and
accessing, by the one or more processor components, one or more element inventories for elements comprising at least controls, metrics, policies, and rules for operation of threat points,
cross referencing, by the one or more processor components, the threat points with the elements to define one or more element matrices;
determining, by the one or more processor components, priorities for the threat points based on the threat points and the one or more element matrices;
displaying, by the one or more processor components, to a user the one or more element matrices within the one or more graphical interfaces illustrating the priorities with respect to the threat points and the elements, including displaying, to the user the threat points within one or more graphical interfaces illustrating the priorities with respect to the threat points alone and integrated with controls, metrics, policies, and rules, wherein the display allows navigation of various elements for connection identification of threats for the resources within an organization;

receiving, by the one or more processor components, a change to at least one element of the elements, including receiving a change to a configuration of one of the resources, wherein the change comprises at least users that can access the resource, ability of the resource to perform a task, and other resources to which the resource is connected;

determining, by the one or more processor components, an effect of the change on the threat points within the threat point matrix;

receiving, by the one or more processor components, an indication from the user that the effect of the change is acceptable; and implementing, by the one or more processor components, the change to a configuration of one of the resources;

accessing, by the one or more processor components, a graphical relational database that stores nodes for relationships between the elements, wherein the graphical relational database illustrates the relationships between the resources, the threat vectors, the controls, the metrics, the policies, and the rules;

determining, by the one or more processor components, the nodes affected by the change to the at least one element;

identifying, by the one or more processor components, other elements associated with the nodes within the graphical relational database;

determining, by the one or more processor components, updated priorities for the threat points based on the nodes affected by the change to the at least one of the elements; and displaying, by the one or more processor components, to the user the one or more element matrices within the one or more graphical interfaces illustrating the updated priorities with respect to the threat points and the elements.

9. The method of claim 8, further comprising:
accessing, by the one or more processing components, a control inventory for the controls within the organization that mitigate the threat points;
defining an element matrix based on the cross referencing, by the one or more processing components, of the controls with the threat points;
determining, by the one or more processing components, the priorities for the threat points based on the controls; and
displaying, by the one or more processing components, to the user the element matrix within the one or more graphical interfaces illustrating the priorities with respect to the threat points and the controls.

10. The method of claim 8, further comprising:
accessing, by the one or more processing components, a metrics inventory for the metrics within the organization that indicate how the threat points are measured;
cross referencing, by the one or more processing components, the metrics with the threat points to define an element matrix;
determining, by the one or more processing components, the priorities for the threat points based on the metrics; and
displaying, by the one or more processing components, to the user the element matrix within the one or more graphical interfaces illustrating the priorities with respect to the threat points and the metrics.

11. The method of claim 8, further comprising:
accessing, by the one or more processing components, a policies inventory for the policies within the organization that indicate operation of the threat points;
cross referencing, by the one or more processing components, the policies with the threat points to define an element matrix;
determining, by the one or more processing components, the priorities for the threat points based on the policies; and
displaying, by the one or more processing components, to the user the element matrix within the one or more graphical interfaces illustrating the priorities with respect to the threat points and the policies.

12. The method of claim 8, further comprising:
accessing, by the one or more processing components, a rules inventory for the rules outside the organization that indicate operation of the threat points;
cross referencing, by the one or more processing components, the rules with the threat points to define an element matrix;
determining, by the one or more processing components, the priorities for the threat points based on the rules; and
displaying, by the one or more processing components, to the user the element matrix within the one or more graphical interfaces illustrating the priorities with respect to the threat points and the rules.

13. The method of claim 8, wherein the one or more element matrices provide a representation of a threat level for the threat points and the elements, and wherein the threat level of the threat points diminishes within the one or more element matrices farther from an origin.

14. The method of claim 8, wherein the resource inventory is structured based on individual resources and resource classes to which each individual resource belongs.

* * * * *